United States Patent [19]

Leduc

[11] 4,290,728
[45] Sep. 22, 1981

[54] RAMP TO LOAD AND UNLOAD VEHICLES INTO AND FROM A TRUCK BODY

[76] Inventor: Lucien Leduc, Box 368, Assiniboia, Saskatchewan, Canada

[21] Appl. No.: 74,252

[22] Filed: Sep. 10, 1979

[30] Foreign Application Priority Data

Sep. 20, 1978 [CA] Canada ................................. 311698

[51] Int. Cl.³ ...................... B65G 67/02; B65G 69/28
[52] U.S. Cl. ...................................... 414/537; 193/41
[58] Field of Search ................. 193/3, 4, 5, 38, 41; 414/537; 182/127, 196, 223; 14/69.5; 404/35; 296/61

[56] References Cited

U.S. PATENT DOCUMENTS

| | | | |
|---|---|---|---|
| 176,872 | 5/1876 | Malone | 14/69.5 |
| 963,918 | 7/1910 | Miller | 193/38 X |
| 1,201,790 | 10/1916 | Allen | 193/41 X |
| 1,293,083 | 2/1919 | Golding | 193/41 |
| 1,357,607 | 11/1920 | Behrens et al. | 193/41 |
| 2,722,359 | 11/1955 | Craft | 182/196 X |
| 3,642,156 | 2/1972 | Stenson | 414/537 |
| 3,713,553 | 1/1973 | Curtis et al. | 414/537 |

*Primary Examiner*—James L. Rowland
*Attorney, Agent, or Firm*—Stanley G. Ade

[57] ABSTRACT

A pair of longitudinally extended stringers include pins at the upper ends thereof to detachably engage apertures drilled in the open tail gate of the vehicle so that the stringers extend to the ground at approximately the same angle as the open tail gate. A plurality of cross members or rungs are secured in spaced and parallel relationship to cables, chains or the like and the lowermost cross member is bolted between the two stringers adjacent the lower ends thereof. When the stringers are secured by the upper ends into the apertures of the tail gate, the cross members are unrolled upwardly along the stringers and the uppermost cross member is then detachably secured to the stringers adjacent the upper ends thereof thus forming a ladder type ramp for the loading or unloading of a snowmobile. If planks are laid longitudinally between the stringers, then any wheeled vehicle such as an all-terrain vehicle or the like, may be loaded or unloaded along the ramp. To store the ramp in the truck body, the cross pieces are disconnected from adjacent the upper ends of the stringers and then rolled downwardly to the lower ends thereof. The stringers are then unhooked from the tail gate and the ramp is loaded onto the floor of the truck body with a stringer line upon each side of the snowmobile or other vehicle and the rolled up cross pieces being situated transversely behind the vehicle.

12 Claims, 6 Drawing Figures

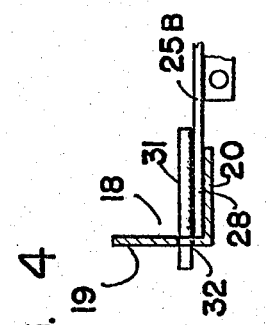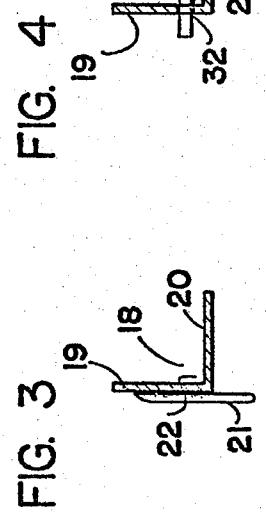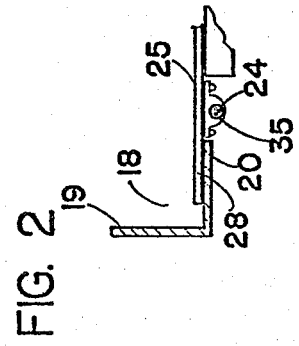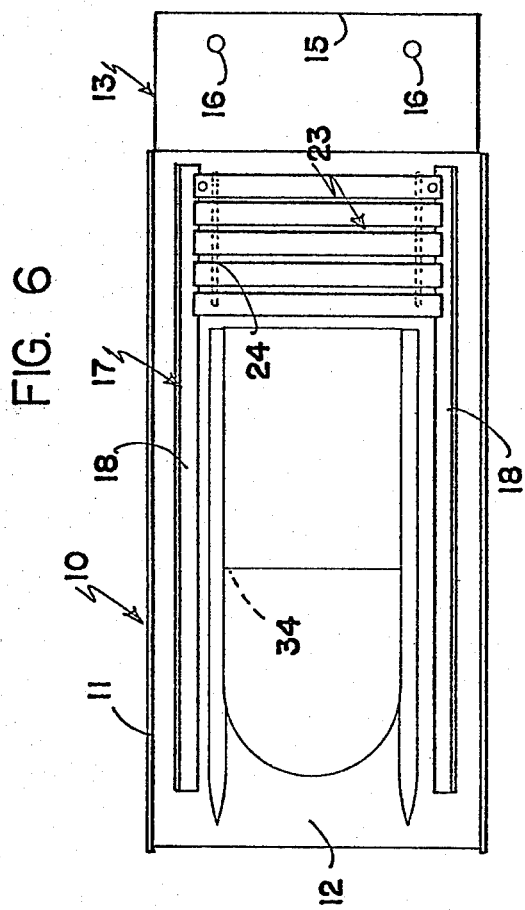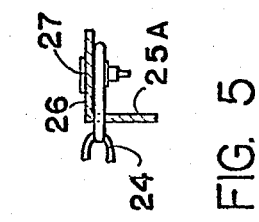

RAMP TO LOAD AND UNLOAD VEHICLES INTO AND FROM A TRUCK BODY

BACKGROUND OF THE INVENTION

This invention relates to new and useful improvements in ramps for the loading and unloading of vehicles such as snowmobiles, all-terrain vehicles and the like, into and from a truck body such as a pick-up truck.

Conventionally, such ramps are relatively heavy and, once having been used, are extremely difficult to store and transport within the truck body together with the vehicle being carried thereby as it will be appreciated that the ramp is usually required to unload the vehicle at the destination.

Prior art devices include U.S. Pat. No.: 1,201,790 which shows a telescopic ramp and U.S. Pat. No.: 1,357,607 which shows a ramp foldable in half.

Often, two planks are laid extending from the tail gate of the vehicle to the ground and the vehicle is driven down these planks. However, it will be appreciated that such a device is unstable and often results in the vehicle falling from the planks with subsequent damage occurring to the vehicle as well as the possibility of injury occurring to the personnel unloading the vehicle.

SUMMARY OF THE INVENTION

The present invention overcomes these disadvantages by providing a ramp assembly which is easily usable by a single person and one aspect of the invention consists of a ramp assembly for use with a truck body which includes a tail gate and means to support said tail gate when opened, at an inclined angle extending outwardly and downwardly towards the ground; said ramp assembly comprising in combination a pair of spaced and parallel, longitudinally extending stringers, having tail gate engaging ends and ground engaging ends, and a flexible ladder assembly operatively connected by one end thereof to adjacent one end of said stringers and rollable along said stringers from a rolled stored position, to an unrolled extended position and vice-versa, means to detachably secure the other end of said ladder assembly to adjacent the other ends of said stringers when in the unrolled extended position, means to support said ladder assembly upon said stringers when in the unrolled extended position and means operatively and detachably connecting said stringers to said tail gate by said tail gate engaging ends thereof whereby said stringers extend downwardly and outwardly from said tail gate to the ground.

Another advantage of the present invention is to provide a device of the character herewithin described which is easily stored around the vehicle upon the floor of the truck body after the vehicle has been loaded into the truck body, and which furthermore can be easily withdrawn and attached to the open tail gate when it is desired to unload the vehicle from the truck body.

Another advantage of the present invention is to provide a device of the character herewithin described which although designed primarily for use with a vehicle such as a snowmobile, is easily converted for use with any wheeled vehicle such as an all-terrain vehicle or the like.

Still another advantage of the invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE INVENTION

FIG. 2 is an enlarged fragmentary cross sectional view along the line 2—2 of FIG. 1.

FIG. 3 is an enlarged fragmentary top end view of one of the stringers.

FIG. 4 is an enlarged fragmentary cross sectional view substantially along the line 4—4 of FIG. 1.

FIG. 5 is an enlarged fragmentary cross sectional view substantially along the line 5—5 of FIG. 1.

FIG. 6 is a schematic top plan view of an open truck body showing the invention in the stored position around a snowmobile shown in dotted line.

In the drawings like characters of reference indicate corresponding parts in the different figures.

DETAILED DESCRIPTION

Figure 1:
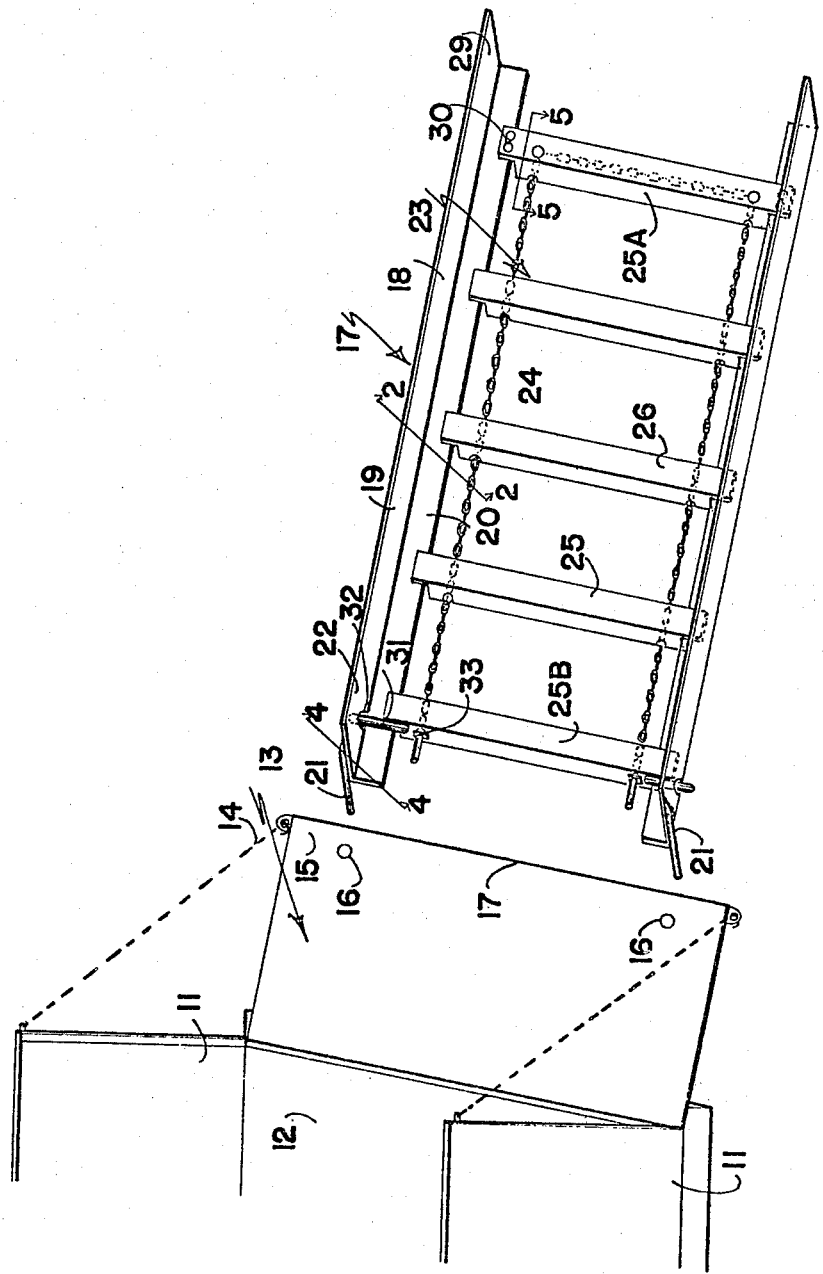
FIG. 1 is an isometric view of the rear end of a truck body with the tail gate in the lowermost position and the ramp assembly in position to engage the tail gate.

Proceeding therefore to describe the invention in detail, reference character 10 illustrates generally a truck body including the sides 11, the floor 12 and a conventional tail gate assembly collectively designated 13 hinged to the rear transverse edge of the floor 12 in the conventional manner and supported in the open position either by a heavy duty bumper (not illustrated) or support chains or cables 14 extending from adjacent the upper rear corners of the sides 11 to adjacent the outermost rear corners 15 of the tail gate. Such means are conventional, the only difference being that in the case of the chains or cables 14, they are lengthened to support the tail gate at approximately 30° from the horizontal when in the open position, so that it inclines outwardly and downwardly towards the ground.

A pair of apertures or drillings 16 are formed in the tail gate adjacent the rear or upper edge 17 thereof, the purpose of which will hereinafter become apparent.

The ramp assembly collectively designated 17 comprises a pair of spaced and parallel longitudinally extending support beams or stringers 18 which are preferably in the form of angle irons and which include vertical flanges 19 and horizontal lower flanges 20 and these angle irons are positioned so that the horizontal flanges 20 face inwardly towards one another as clearly shown in FIG. 1.

Means are provided to detachably support the ramp assembly from the tail gate 13 so that, when the tail gate is open and the ramp engages therewith, it extends downwardly towards the ground at an angle substantially similar to the angle of the open tail gate 13.

In this embodiment, downwardly extending pins 21 are welded one each to the upper or tail gate engaging end 22 of the stringers 18 and these engage the apertures 16 thus locking the ramp assembly firmly in position relative to the tail gate and also maintaining the desired spaced and parallel relationship of the stringers particularly at the upper end thereof.

A ladder assembly is provided collectively designated 23, said ladder assembly comprising a pair of longitudinally extending flexible members 24 which may take the form of chains, cables, ropes or the like depending upon the design parameters of the assembly.

A plurality of cross members or rungs 25 are secured along the length of flexible members 24 in spaced and parallel relationship therewith and it is preferable that these cross members or rungs also be of angle iron construction or the like with the horizontal flanges 26 being secured to the flexible members adjacent the ends thereof by means of nut and bolt assemblies 27 or the equivalent. The vertical members extend downwardly and act as stiffening flanges and these vertical members are cut away at the ends thereof so that when in the unrolled position shown in FIG. 1, the ends 28 of the horizontal flanges rest upon the horizontal flanges 20 of the stringers with the vertical flanges of the rungs depending downwardly therebetween. However, flat members can be used and if necessary, stiffened by means of vertical webs formed or secured thereon.

The lowermost rung specifically designed 25A is bolted or otherwise secured to adjacent the ground engaging ends 29 of the stringers by means of nut and bolt assemblies 30 and this acts to maintain the lower ends of the stringers in the desired spaced and parallel relationship.

When in the unrolled or extended position, the ladder assembly 23 extends along the length of the stringers with the ends of the rungs resting upon the horizontal flanges 20 thereof and means are provided to detachably secure the ladder in the extended position. In this embodiment, said means consist of a pair of pins 31 secured one to each side of the uppermost stringer specifically designed 25B and extending outwardly therefrom. These engage within apertures 32 formed in the vertical flanges 19 of the stringers 18 adjacent the upper or tail gate engaging ends 22. In this connection, the upper ends of the stringers may be spread apart slightly to receive the bolt or pin 31 prior to the upper end of the ramp assembly being engaged with the tail gate via the downwardly extending pins 21.

Conventional chain or cable tighteners 33 are provided adjacent the upper ends of the chain co-operating with the uppermost rung 25B so that the tension of the chains or cables 24 may be adjusted in order to limit the relative movement of the rungs 26 as the vehicle is being driven thereover.

In operation, the ramp assembly is assembled by unrolling the ladder assembly 23 and fastening the upper ends thereof to the stringers by means of the transverse pin 31 engaging the aperture or drilling 32. The ramp assembly is then engaged with the tail gate as hereinbefore described and a vehicle such as a snowmobile (shown in phantom in FIG. 6 by reference character 34) is then driven down the ramp to the ground.

If the vehicle is other than a snowmobile, then a pair of planks (not illustrated) may be laid across the rungs so that the wheels of the vehicle may engage with the planks.

It will be observed that the vertical flanges 19 of the stringers 17 act as guide rails for the vehicle being driven on the ramp assembly, whether this vehicle is a snowmobile or a wheeled vehicle.

Such a vehicle may be loaded into the truck body in a similar manner by driving it up the ramp, across the tail gate and into the body of the vehicle, whereupon the ladder assembly is disconnected at the upper end of the stringers and rolls downwardly towards the ground engaging ends 29. The stringers may then be disconnected from the tail gate and loaded upon the floor 12 of the truck body so that the stringers lie one upon each side of the vehicle loaded into the truck body with the rolled up ladder assembly extending transversely between the stringers at the rear of the vehicle as clearly shown in FIG. 6.

Finally, it should be observed that the cables or chains 24 are secured to the undersides of the rungs 25 by means of clips and bolt assemblies 35 in order to keep clear the upper surfaces of the transverse rungs 25.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my Invention is:

1. A ramp assembly for use with a truck body which includes a tail gate and means to support said tail gate when opened, at an inclined angle extending outwardly and downwardly towards the ground; said ramp assembly comprising in combination a pair of spaced and parallel, longitudinally extending stringers, having tail gate engaging ends and ground engaging ends, and a flexible ladder assembly operatively connected by one end thereof to adjacent one end of said stringers and rollable along said stringers from a rolled stored position, to an unrolled extended position and vice-versa, means to detachably secure the other end of said ladder assembly to adjacent the other ends of said stringers when in the unrolled extended position, means to support said ladder assembly upon said stringers when in the unrolled extended position and means operatively and detachably connecting said stringers to said tail gate by said tail gate engaging ends thereof whereby said stringers extend downwardly and outwardly from said tail gate to the ground, said stringers comprising members having horizontal flanges and vertical flanges, said ladder assembly including flexible, longitudinally extending rung support means and a plurality of transverse rungs secured in spaced and parallel relationship along the length of said rung support means, the distal ends of said rungs engaging upon and being supported by the horizontal flanges of said stringers, the vertical flanges of said stringers acting as guide rails for the vehicle driven thereon.

2. The ramp assembly according to claim 1 in which said means operatively and detachably connecting said stringers to said tail gate include means extending from the tail gate engaging ends of said stringers, detachably engaging means in said tail gate.

3. The ramp assembly according to claim 2 in which said flexible ladder assembly includes a plurality of spaced and parallel rungs, flexible means supporting said rungs in said spaced and parallel relationship, and means to adjust the tension of said flexible means when said ladder assembly is in the unrolled extended position upon said stringers.

4. The ramp assembly according to claim 3 in which said means to detachably secure the other end of said ladder assembly to adjacent the other ends of said stringers when in the unrolled position, includes outwardly projecting means secured to the distal rung of said ladder assembly operatively connecting to each of said stringers when said ladder assembly is in the unrolled extended position.

5. The ramp assembly according to claim 1 in which said flexible ladder assembly includes a plurality of spaced and parallel rungs, flexible means supporting said rungs in said spaced and parallel relationship, and means to adjust the tension of said flexible means when said ladder assembly is in the unrolled extended position upon said stringers.

6. The ramp assembly according to claim 5 in which said means to detachably secure the other end of said ladder assembly to adjacent the other ends of said stringers when in the unrolled position, includes outwardly projecting means secured to the distal rung of said ladder assembly operatively connecting to each of said stringers when said ladder assembly is in the unrolled extended position.

7. The ramp assembly according to claims 5 or 6 in which said means operatively and detachably connecting said stringers to said tail gate include means extending from the tail gate engaging ends of said stringers, detachably engaging means in said tail gate, and one end rung being secured by the ends thereof to adjacent the ground engaging ends of said stringers.

8. The ramp assembly according to claim 1, 5 or 6 in which said means to detachably secure the other end of said ladder assembly to adjacent the other ends of said stringers when in the unrolled position, includes outwardly projecting means secured to the distal rung of said ladder assembly operatively connecting to each of said stringers when said ladder assembly is in the unrolled extended position.

9. The ramp assembly according to claims 1, 2 or 5 in which said stringers comprise right angular cross sectional members such as angle irons and having horizontal and vertical flanges, the two stringers being positioned so that the horizontal flanges of said stringers face inwardly towards one another, said ladder assembly resting on said horizontal flanges by the outer ends thereof when in the unrolled extended position, the vertical flanges of said stringers acting as guide rails for the vehicle driven thereon.

10. The ramp assembly according to claims 3, 6 or 4 in which said stringers comprise right angular cross sectional members such as angle irons and having horizontal and vertical flanges, the two stringers being positioned so that the horizontal flanges of said stringers face inwardly towards one another, said ladder assembly resting on said horizontal flanges by the outer ends thereof when in the unrolled extended position, the vertical flanges of said stringers acting as guide rails for the vehicle driven thereon.

11. The ramp assembly according to claim 1 in which said means operatively and detachably connecting said stringers to said tail gate include means extending from the tail gate engaging ends of said stringers, detachably engaging means in said tail gate, and one end rung being secured by the ends thereof to adjacent the ground engaging ends of said stringers.

12. The ramp assembly according to claim 11 in which said means to detachably secure the other end of said ladder assembly to adjacent the other ends of said stringers when in the unrolled position, includes outwardly projecting means secured to the distal rung of said ladder assembly operatively connecting to each of said stringers when said ladder assembly is in the unrolled extended position.

* * * * *